(12) United States Patent
Suzuki

(10) Patent No.: US 7,744,405 B2
(45) Date of Patent: Jun. 29, 2010

(54) CONDUCTION TERMINAL AND ADAPTER FOR CONDUCTION TERMINAL

(75) Inventor: Katsuaki Suzuki, Ryugasaki (JP)

(73) Assignee: Tyco Electronics Raychem K.K., Kawasaki, Kanagawa (JP)

( * ) Notice: Subject to any disclaimer, the term of this patent is extended or adjusted under 35 U.S.C. 154(b) by 656 days.

(21) Appl. No.: 10/525,834

(22) PCT Filed: Aug. 28, 2003

(86) PCT No.: PCT/JP03/10948

§ 371 (c)(1),
(2), (4) Date: Apr. 4, 2006

(87) PCT Pub. No.: WO2004/021479

PCT Pub. Date: Mar. 11, 2004

(65) Prior Publication Data

US 2006/0215333 A1    Sep. 28, 2006

(30) Foreign Application Priority Data

Aug. 30, 2002    (JP) .............................. 2002-255782

(51) Int. Cl.
*H01R 11/00*    (2006.01)
(52) U.S. Cl. ..................................................... 439/504
(58) Field of Classification Search .............. 439/500, 439/627, 158, 754
See application file for complete search history.

(56) References Cited

U.S. PATENT DOCUMENTS

| 3,625,766 A | * | 12/1971 | Paine et al. ................. 429/142 |
| 4,255,698 A | | 3/1981 | Simon |
| 4,973,936 A | | 11/1990 | Dimpault-Darcy et al. |
| 5,662,497 A | * | 9/1997 | Reilly .......................... 439/627 |
| 6,044,296 A | * | 3/2000 | Zhu et al. ..................... 607/13 |
| 7,270,576 B2 | * | 9/2007 | Kim et al. .................... 439/627 |
| 2007/0184341 A1 | * | 8/2007 | Yoon et al. ................... 429/152 |

FOREIGN PATENT DOCUMENTS

| EP | 1091366 A1 | 4/2001 |
| JP | 64-35667 U | 3/1989 |
| JP | 2-117662 | 9/1990 |
| JP | 3-77263 A | 4/1991 |
| JP | 5-325942 A | 12/1993 |
| JP | 7-57721 A | 3/1995 |
| JP | 2001-216883 A | 8/2001 |
| JP | 2002-56755 A | 2/2002 |
| WO | WO 98/20567 A | 5/1998 |
| WO | WO 00/16429 A | 3/2000 |

OTHER PUBLICATIONS

International Search Report for International Application No. PCT/JP2003/010948, Dec. 9, 2003.
European Supplementary Search Report dated Dec. 30, 2008, for European Application No. 03791380.3.

* cited by examiner

*Primary Examiner*—Jean F Duverne

(57) ABSTRACT

In a current conducting terminal in contact with the positive electrode of a battery (A) and with the negative electrode of a battery (B) in order to conduct current between the two batteries (A), (B), a conductive polymer is placed between the positive electrode side electrode 1, which is in contact with the positive electrode of the battery (A), and the negative electrode side electrode (2), which is in contact with the negative electrode of the battery (B).

5 Claims, 5 Drawing Sheets

CONDUCTION TERMINAL AND ADAPTER FOR CONDUCTION TERMINAL

REFERENCE TO RELATED APPLICATIONS

This application is the National Stage of International Application No. PCT/JP2003/010948, filed Aug. 28, 2003, the disclosure of which is incorporated herein by reference.

TECHNICAL FIELD

This invention relates to a current conducting terminal and an adapter therefor, which are used in a battery-operated electrical apparatus and which are directly in contact with the battery.

BACKGROUND ART

With the increased capacity of batteries, electrical apparatus using batteries is often, as with electrical apparatus using ordinary commercial power sources, provided with overcurrent protection devices such as thermistors and the like, which cut off the current flow when there is current exceeding a certain level. As mobile products such as digital cameras and video cameras become more popular, the market ratio of such electrical apparatus provided with overcurrent protection devices is also increasing.

In the above electrical apparatus in the prior art, the overcurrent protection device is provided in the main circuit substrate comprising the electrical equipment. Thus, if a short circuit occurs through some failure in a position closer to the battery than the circuit substrate, the overcurrent protection device will not function, and in some cases the batteries may overheat rapidly and fail.

This invention was made in view of the above circumstances and has the purpose of preventing the battery from failing even if a short circuit occurs through some failure in a position closer to the battery than the circuit substrate and ensuring the integrity and safety of electrical apparatus.

BRIEF SUMMARY DISCLOSURE OF THE INVENTION

In order to solve the above problem, a current conducting terminal having the following construction is adopted.

To wit, the current conducting terminal of this invention is a current conducting terminal which is in contact with either the positive or the negative electrode of one battery and in contact with an electrode of opposite polarity of another battery for conducting current between the two batteries, comprising: one electrode which is in contact with the either positive or negative electrode of the one battery; another electrode which is in contact with the electrode of opposite polarity of the another battery; and a conductive polymer which is placed between the one electrode and the another electrode.

The conductive polymer is a polymer resin composed by kneading for example polyethylene and carbon black together and crosslinking thereafter with radiation. Within the conductive polymer, the carbon black particles are linked to each other in a room-temperature environment so that numerous conductive paths are formed through which current flows, and good conductivity is exhibited. However, when the conductive polymer expands thermally due to excessive current flowing in the conductive paths or a rise in the ambient temperature, the distances between the carbon black particles are increased, thus severing the conductive paths, and conductivity decreases sharply (the resistance rises sharply). This is called the positive temperature coefficient of a conductive polymer, or PTC. This invention utilizes this characteristic.

The current conducting terminal of this invention utilizes the above PTC characteristic and, if a short circuit occurs in a position closer to the batteries than the circuit substrate on which an overcurrent protection device is provided, the conductive polymer will self-generate heat through Joule heat and thermally expand if an overcurrent occurs due to the short circuit, thereby increasing the distances between the carbon black particles and severing the conductive paths to cut off current flow between the two batteries.

Also, if the resistance generated through the above short circuit reaches a certain level and there is no overcurrent, current will flow within a closed circuit formed by the short circuit; in this case, the battery will heat rapidly due to the current flow and raise the ambient temperature, so that the conductive polymer is affected by the ambient temperature and thermally expands, thereby increasing the distances between the carbon black particles and severing the conductive paths to similarly cut off current flow between the two batteries.

By this means, battery failure caused by an overcurrent or a rise in the ambient temperature is prevented. Further, the current conducting terminal of this invention is very effective as it can strengthen the overcurrent protection and temperature protection functions without in any way changing the circuit substrate of the electrical apparatus.

In the current conducting terminal of this invention, it is preferable that a contact which is provided on the one electrode to contact for the one battery and a contact which is provided on the another electrode to contact for the another battery are exposed, while the other parts are encased in a resin body. This improves the handling characteristics of the current conduction device as a component.

The electrical apparatus of this invention is an electrical apparatus, comprising: a battery box; a seat which is provided on the battery box, and supports the current conducting terminal; and a holding means which is provided on the seat or the current conducting terminal, and secures the current conducting terminal.

In the electrical apparatus of this invention, the current conducting terminal of this invention with the handling characteristics improved by encasing in a resin body is secured stably to the electrical apparatus.

The current conducting terminal of this invention is a current conducting terminal which is in contact with either the positive or the negative electrode of a battery to supply current to a circuit, comprising: one electrode which is in contact with the either positive or negative electrode of the battery; another electrode which is connected to the circuit; and a conductive polymer which is placed between the one electrode and the another electrode.

The current conducting terminal of this invention also utilizes the above PTC characteristic; when the current conducting terminal of this invention is placed in contact with an electrode of a battery, if a short circuit occurs in a position closer to the batteries than the circuit substrate on which an overcurrent protection device is provided, the conductive polymer will self-heat through Joule heat and thermally expand if an overcurrent occurs due to the short circuit, thereby increasing the distances between the carbon black particles and severing the conductive paths to cut off current flow between the two batteries. By this means, battery failure caused by an overcurrent or a rise in the ambient temperature is prevented.

Further, the current conducting terminal of this invention is very effective as it can strengthen the overcurrent protection and temperature protection functions by merely replacing an existing current conducting terminal without in any way changing the circuit substrate of the electrical apparatus.

The current conducting terminal adapter of this invention is a current conducting terminal adapter which is attached to a current conducting terminal which is in contact with either the positive or the negative electrode of a battery for conducting current to a circuit, comprising: a relay current conduction piece; and a resin body which holds the relay current conduction piece, and is attachable to or detachable from the current conducting terminal; wherein the relay current conduction piece includes: one electrode which is in contact with the current conducting terminal; another electrode which is in contact with the electrode of opposite polarity of the battery; and a conductive polymer which is placed between the one electrode and the another electrode.

When the current conducting terminal adapter of this invention is installed on a current conducting terminal, if a short circuit occurs in a position closer to the battery than the circuit substrate on which an overcurrent protection device is provided, the conductive polymer will self-generate heat through Joule heat and thermally expand if an overcurrent occurs due to the short circuit, thereby increasing the distances between the carbon black particles and severing the conductive paths to cut off current flow between the two batteries. By this means, battery failure caused by an overcurrent or a rise in the ambient temperature is prevented.

Further, the current conducting terminal adapter of this invention is very effective as, while it goes without saying that it may be added from the design stage on an electrical apparatus provided with a current conducting terminal, the overcurrent protection or temperature protection functions may be enhanced afterwards on an electrical apparatus that has been made into a product, by adding the adapter to an existing current conducting terminal.

DETAILED DESCRIPTION OF BEST MODES FOR CARRYING OUT THE INVENTION

First Embodiment

Figure 1:
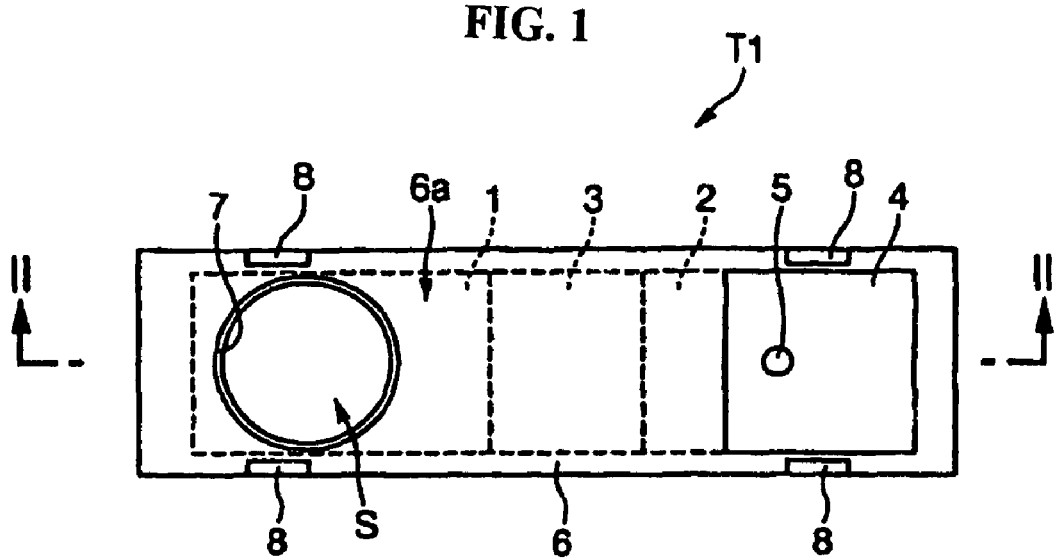
FIG. 1 is a plan view showing the first embodiment of this invention.
Figure 2:
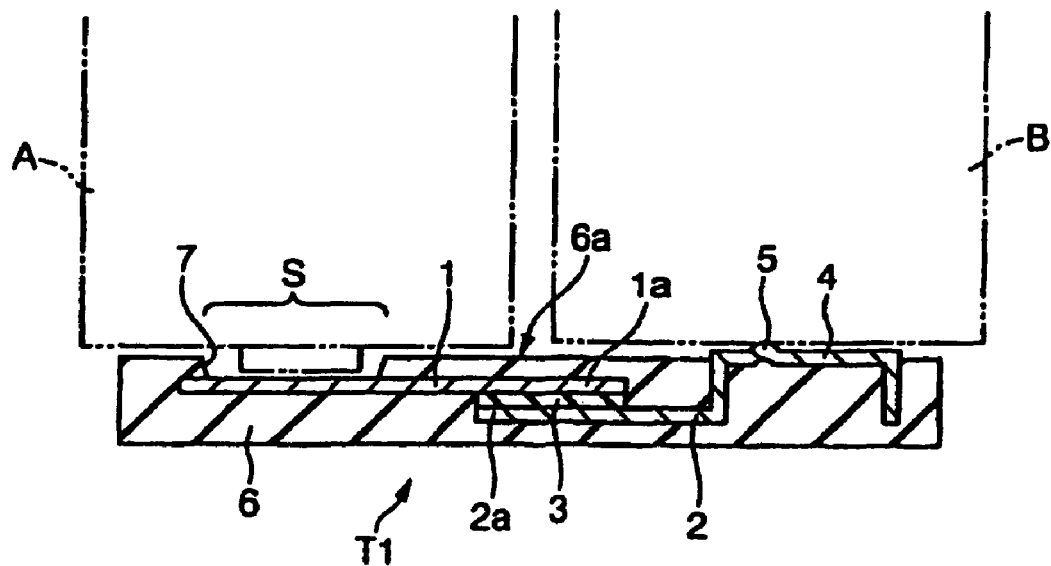
FIG. 2 is a cross-sectional view at the line II-II in FIG. 1.
Figure 3:
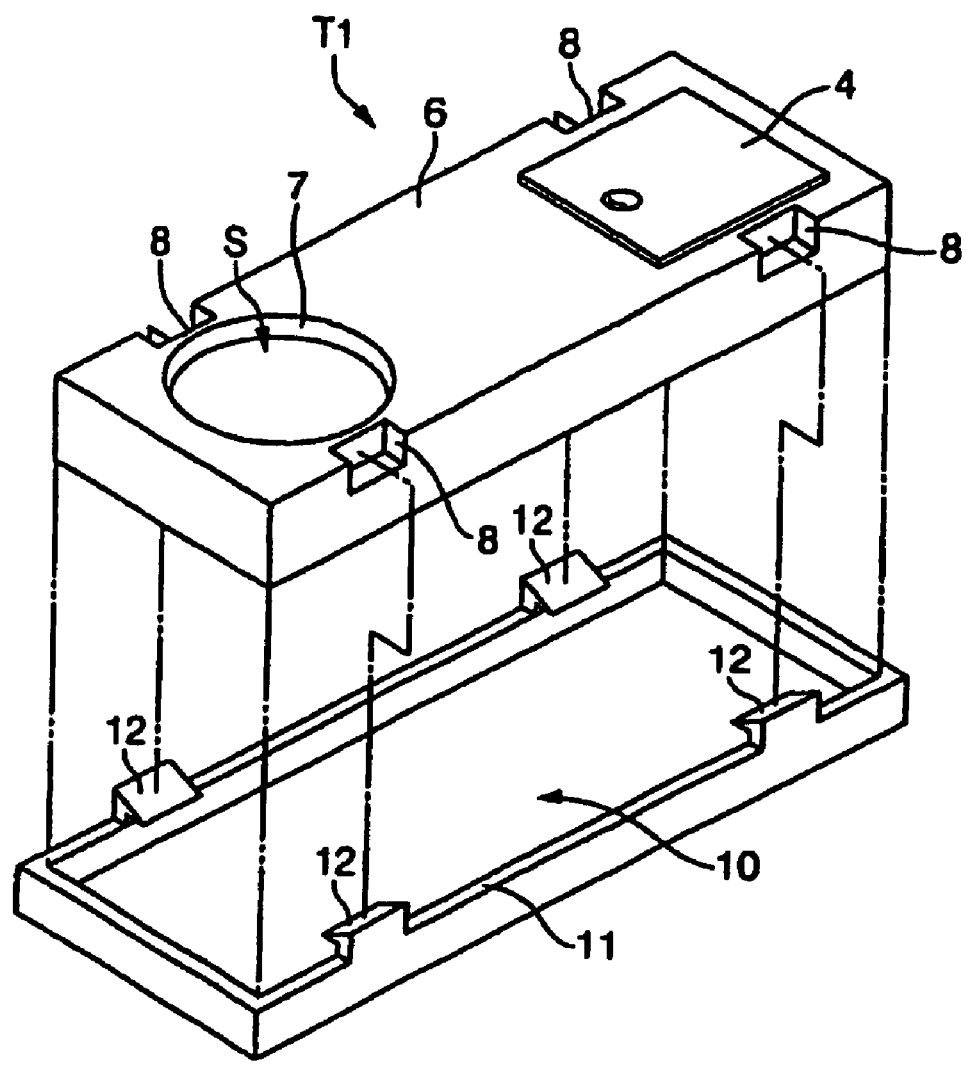
FIG. 3 is a perspective view showing an electrical apparatus of which the current conducting terminal is a part, showing in particular the interior of the battery box.

A first embodiment of this invention is explained as shown in FIG. 1 through FIG. 3.

The current conducting terminal T1 in this embodiment is installed in the battery box of an electrical apparatus using a plurality of batteries, for the purpose of ensuring current flow between the batteries. The structure comprises, as shown in FIG. 1 and FIG. 2, a positive electrode side electrode 1 (one electrode) placed in contact with the positive electrode of a battery A, a negative electrode side electrode 2 (the other electrode) placed in contact with the negative electrode of the other battery B that is connected in series with the battery A, and a conductive polymer 3 placed between these electrodes 1, 2.

The two electrodes 1, 2 on the positive electrode and negative electrode sides are each in a flat sheet form with a uniform thickness; in particular, the positive electrode side electrode 1 is a rectangular-shaped metal sheet when seen from a plan view. The negative electrode side electrode is also a rectangular-shaped metal sheet when seen from a plan view; however, a protrusion 4 that is square-shaped when seen from a plan view is formed in the section that comes in direct contact with the negative electrode of the battery B. Further, a nodule 5 is formed in a position that is slightly off-center of the protrusion 4 in order to ensure sufficient contact pressure against the flat negative electrode of the battery B for a reliable contact.

One end 1a of the positive electrode side electrode 1 that is not in contact with the battery A and one end 2a of the negative electrode side electrode 2 that is not in contact with the battery B are superposed and the conductive polymer 3 is provided between the ends 1a, 2a in such a way as to join the two electrodes 1, 2. The melting of the polyethylene comprising the conductive polymer 3 is utilized to bond between the electrode 1 and the conductive polymer 3, as well as the electrode 2 and the conductive polymer 3.

The three components, namely the two electrodes 1, 2 on the positive electrode and negative electrode sides and the conductive polymer 3 are encased in a resin body 6 made of polycarbonate or ABS, with the exception of the contact of the positive electrode side electrode 1 that the battery A is directly touching (region S) and the contact of the electrode 2 that the battery B is directly touching (upper surface of the protrusion 4). The resin body 6 is also rectangular-shaped when seen from a plan view and is of a uniform thickness. The three bonded components above are inserted by being slipped inside through a slit (not illustrated) provided on a side edge of the resin body 6, and integrated by later filling up the slit.

When the three components encased in the resin body 6 are seen cross-sectionally (see FIG. 2), the contact (region S) of the positive electrode side electrode 1 is exposed at the bottom of an open hole 7 formed by digging down from the upper surface 6a of the resin body 6. This is a configuration to prevent connection errors so that if the positive and negative of the battery is erroneously reversed, the negative electrode will not come in contact with the positive electrode side electrode 1. The contact on the negative electrode side electrode 2 (upper part of the protrusion 4) is exposed, protruding slightly above the upper surface 6a of the resin body 6.

FIG. 3 shows part of a battery box of an electrical apparatus using two batteries. A seat 10 supporting the current conducting terminal 111 configured as described above is provided in the battery box. This seat 10 comprises a square protruding bar formed to fit the plane shape of the resin body 6 and envelop its perimeter; the current conducting terminal T1 is supported by fitting the resin body inside the seat 10. Further, on the two edges of the resin body 6 in the longitudinal direction, two recesses 8 are formed mutually distanced in the longitudinal direction, and hooks 12 are formed on the protruding bar 11, which engage the recesses 8 when the resin body is fitted (the recesses 8 and the hooks 12 together constitute the holding means of the current conducting terminal T1).

When the current conducting terminal T1 configured as described above is attached to the battery box as shown in FIG. 3 and the electrical apparatus is operated by installing two batteries, current will, in a normal situation, flow between the two batteries (A, B) connected in series in the order of the positive electrode side electrode 1, conductive polymer 3, and negative electrode side electrode 2. The conductive polymer 3 will not thermally expand unless an overcurrent flows in the configured circuit including the current conducting terminal T1 and will exhibit good conductivity, ensuring the current conducting state of the circuit comprising the electrical apparatus.

When this state changes and a short circuit occurs in a position closer to the batteries A, B than the circuit substrate comprising the electrical apparatus (for example, a conductive object may penetrate the battery box), causing an overcurrent to be generated, the conductive polymer 3 in the current conducting terminal T1 self-generates heat through Joule heat and thermally expands; the distances between the carbon black particles expand to sever the conductive paths, and current between the batteries A, B is cut off. Also, if the resistance produced by the short circuit reaches a certain level and overcurrent is not generated, current will flow within the closed circuit formed by the short circuit. In this case, the battery will generate heat rapidly due to the current flow to raise the ambient temperature so that the conductive polymer 3 in the current conducting terminal T1 will be affected by the ambient temperature and thermally expand; the distances between the carbon particles will expand to sever the conductive paths, and current between the batteries A, B will again be cut off.

In the current conducting terminal T1 described above, the three components, namely the two electrodes 1, 2 on the positive electrode side and the negative electrode side, and the conductive polymer 3, are encased in a hard resin body 6 with only the contacts for the batteries A, B being exposed. During assembly of the electrical apparatus, the current conducting terminal T1 should be handled by holding the resin body 6 without touching the electrode section. The terminal is secured in the prescribed position, such as a battery box and the like, by engaging the recesses 8 on the resin body 6 side and the hooks 12 on the battery box side.

Thus, according to the current conducting terminal T1 configured as described above, current flow between the batteries A, B is cut off immediately if a short circuit occurs in a position closer to the batteries A, B than the circuit substrate comprising the electrical apparatus and an overcurrent is generated or there is a rise in the ambient temperature, so that battery failure caused thereby may be prevented and accompanying problems on the electrical apparatus may further be prevented. In addition, the current conducting terminal T1 of this embodiment is very effective as it can enhance overcurrent protection and temperature protection functions without changing in any way the circuit substrate comprising the electrical apparatus.

Also, by encasing in a resin body 6 the three components that require care in handling, namely the two electrodes 1, 2 on the positive electrode side and the negative electrode side, and the conductive polymer 3, the handling characteristic of the current conducting terminal T1 as a component is enhanced when assembling the electrical apparatus.

In this embodiment, the recesses 8 provided on the resin body 6 and the hooks 12 provided on the seat 10 comprise the holding means for the current conducting terminal T1. The holding means is not restricted to the above, and any configuration may be selected. For example, a slide rail may be provided on the seat 10 to slide in the resin body 6 from the side; if strength is required, screw fastening, or bonding with an adhesive, and the like, may be used.

Second Embodiment

Figure 4:
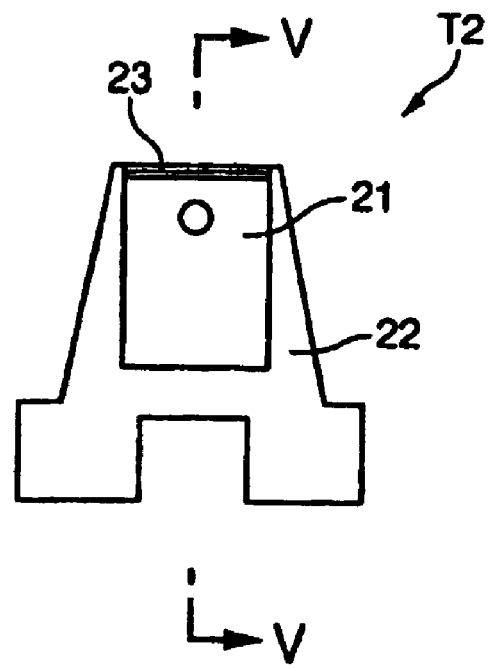
FIG. 4 is a plan view showing the second embodiment of this invention.
Figure 5:
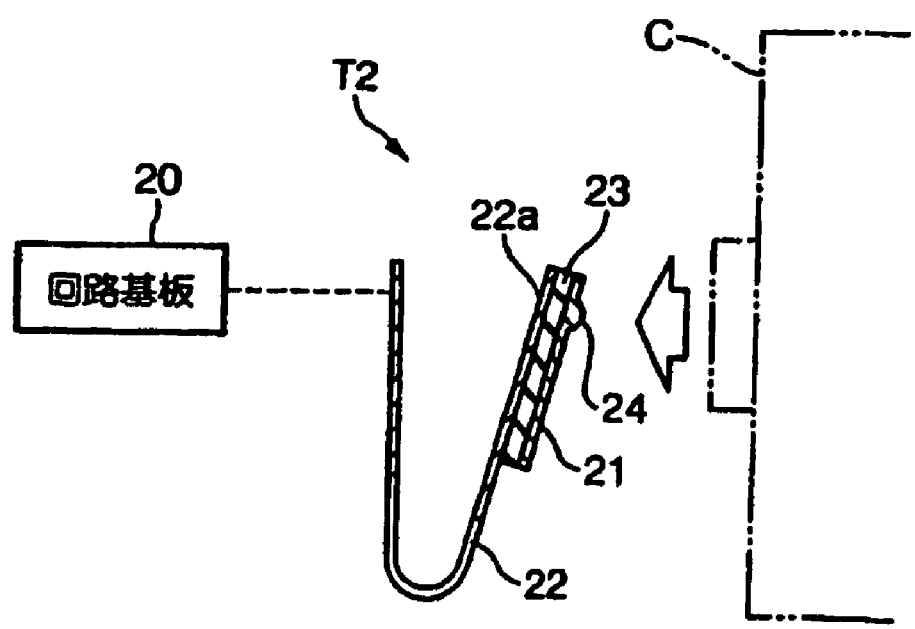
FIG. 5 is a cross-sectional view at the line V-V in FIG. 4.

A second embodiment of this invention is explained as shown in FIG. 4 and FIG. 5.

The current conducting terminal T2 in this embodiment is installed in the battery box of an electrical apparatus in order to ensure current flow between the battery C and the circuit substrate 20. As shown in FIG. 4 and FIG. 5, the structure comprises an electrode (one electrode) 21 that is placed in contact with either the positive or the negative electrode of the battery C, an electrode (the other electrode) 22 that is connected either directly or via a lead wire and the like to the circuit substrate 20, and a conductive polymer 23 placed between the electrodes 21,22.

The electrode 21 is in a flat sheet form with a uniform thickness; it is a rectangular-shaped metal sheet when seen from a plan view and is the part that is in direct contact with an electrode on the battery C. A nodule 24 is formed in a position that is slightly off-center thereof in order to ensure sufficient contact pressure against the electrode on the battery C for a reliable contact. The electrode 22 is a metal sheet that is initially in a flat sheet form with a uniform thickness that has been plastically deformed into a U-shape when seen from the side; the elastic force of the bent section is used as a means to produce contact pressure on the battery C.

The conductive polymer 23 is provided between the superposed electrode 21 and one end 22a of the electrode 22 in such a way as to join the two electrodes 21, 22. As in the first embodiment, the electrode 21 and the conductive polymer 23, and the electrode 22 and the conductive polymer 23 are bonded by utilizing the melting of the polyethylene resin comprising the conductive polymer 23.

When the current conducting terminal T2 configured as described above is attached to the battery box and the electrical apparatus is operated by installing a battery, current will, in a normal situation, flow between the battery C and the circuit substrate 20 in the order of the electrode 21, conductive polymer 23, and electrode 22. The conductive polymer 23 will not thermally expand unless an overcurrent flows in the configured circuit including the current conducting terminal T1 and will exhibit good conductivity, ensuring the current conducting state of the circuit comprising the electrical apparatus.

When this state changes and a short circuit occurs in a position closer to the battery C than the circuit substrate 20 comprising the electrical apparatus, the generation of overcurrent or a rise in the ambient temperature caused by this short circuit will cause the conductive polymer 23 in the current conducting terminal T2 to thermally expand, and the distances between the carbon particles will expand to sever the conductive paths, so that current between the battery C and the circuit substrate 20 will be cut off. By this means, battery failure may be prevented and accompanying problems on the electrical apparatus may further be prevented.

The current conducting terminal T2 of this embodiment is very effective as it can also enhance overcurrent protection and temperature protection functions by merely replacing an existing current conducting terminal, without changing in any way the circuit substrate 20.

Third Embodiment

Figure 6:
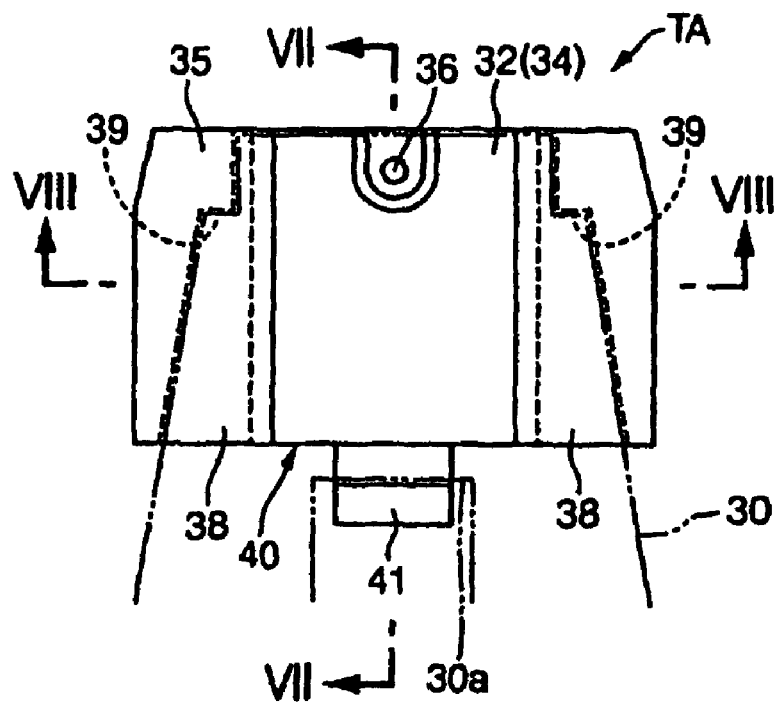
FIG. 6 is a plan view showing the third embodiment of this invention.
Figure 7:
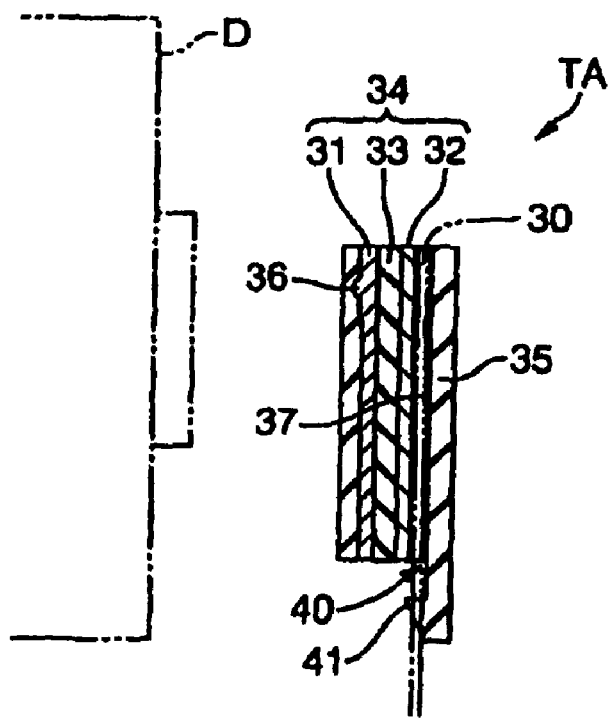
FIG. 7 is a cross-sectional view at the line VII-VII in FIG. 6.
Figure 8:
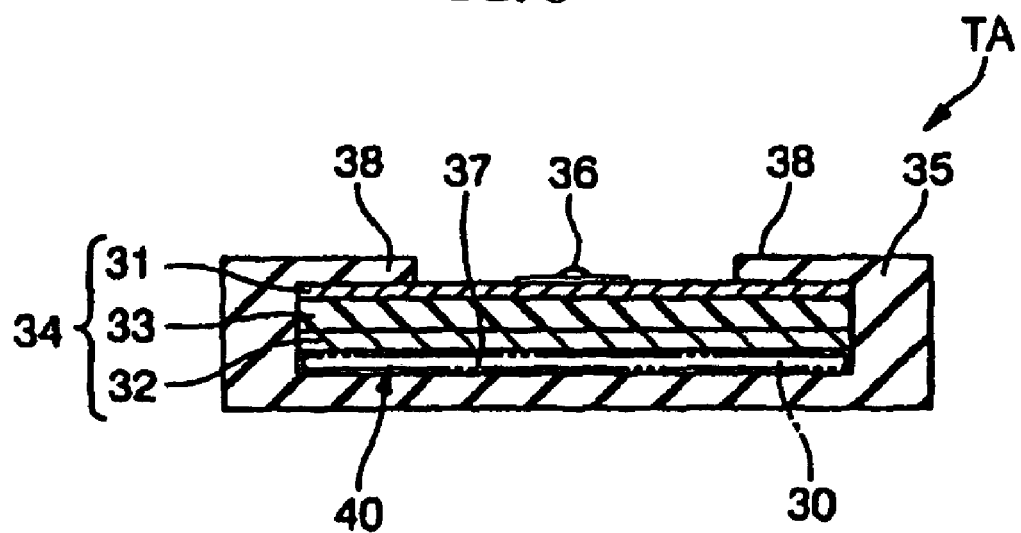
FIG. 8 is a cross-sectional view at the line VIII-VIII in FIG. 6.

A third embodiment of this invention is explained as shown in FIG. 6 through FIG. 8.

The current conducting terminal adapter TA is attached to an existing current conducting terminal in the battery box of an electrical apparatus in such a way as to be placed between the terminal and the battery D. As shown in FIG. 6 and FIG. 7, the structure consists of a relay current conducting piece 34, comprising a conductive polymer 33 placed between an electrode (one electrode) 31 to be placed in contact with the current conducting terminal 30 and an electrode (the other electrode) 32 to be connected to an electrode on the battery D, the piece being held in a resin body 35 that is detachably attachable to the current conducting terminal 30.

The electrodes 31, 32 are each in a flat sheet form with a uniform thickness and are each a rectangular-shaped metal sheet of roughly the same size when seen from a plan view. When the current conducting terminal adapter TA is installed on the current conducting terminal 30, the electrode is in direct contact with an electrode on the battery D and the electrode 32 with the current conducting terminal 30. A nodule 36 is formed on the surface of the electrode 31 in order to ensure sufficient contact pressure against the on the battery D for a reliable contact.

The conductive polymer 33 is provided between the electrode 31 and the electrode 32, which are superposed, in such a way as to bond the two electrodes 31, 22. As in the first and second embodiments, the electrode 31 and the conductive polymer 33, and the electrode 32 and the conductive polymer 33 are bonded by utilizing the fusing of the polyethylene resin comprising the conductive polymer 33.

The resin body 35 has a shape, when seen from the direction in which the current conducting terminal is inserted, has a shape wherein hooked sections 3d, which hold the relay current conduction piece 34, are provided on the two sides of a groove into which the current conducting terminal 30 is inserted. The width of the groove 37 narrows as it goes deeper (see FIG. 6) in keeping with the shape of the current conducting terminal 30; protruding sections 39 are formed, which matches the shoulders of the current conducting terminal 30 and determines the position of the adapter against the current conducting terminal 30.

Between the relay current conduction piece 34 held by the hooked sections 38 and the groove 37, a gap 40 is provided for insertion of the current conducting terminal 30. The width of the gap 40 is slightly narrower than the thickness of the current conducting terminal 30 in order to ensure sufficient contact pressure between the current conducting terminal 30 and the electrode 31.

A hook 41 is also provided on the resin body 35 to secure the body to the current conducting terminal 30. A cut-out section 30a is formed at the base tip on the current conducting terminal 30, and the hook 41 engages to this cut-out section 30a.

When the current conducting terminal adapter TA configured as described above is attached to the current conducting terminal on the battery box and the electrical apparatus is operated by installing a battery, current will, in a normal situation flow, between the battery D and an unillustrated circuit substrate in the order of the electrode 31, conductive polymer 33, electrode 32, and current conducting terminal 30. The conductive polymer 23 will not thermally expand unless an overcurrent flows in the configured circuit including the current conducting terminal adapter TA and will exhibit good conductivity, ensuring the current carrying state of the circuit configuring the electrical apparatus.

When this state changes and a short circuit occurs in a position closer to the battery D than the circuit substrate comprising the electrical apparatus, the generation of overcurrent or a rise in the ambient temperature caused by this short circuit will cause the conductive polymer 33 in the current conducting terminal adapter TA to thermally expand, and the distances between the carbon particles will expand to sever the conductive paths, so that current between the battery D and the circuit substrate will be cut off. By this means, battery failure may be prevented and accompanying problems on the electrical apparatus may further be prevented.

Needless to say, the current conducting terminal adapter TA of this embodiment may be added in the design stage to an electrical apparatus provided with a current conducting terminal; if it is attached to an installed current conducting terminal in an electrical apparatus that has been made into a product, it is very effective since overcurrent protection and temperature protection functions may be enhanced afterwards. Specifically, since all that is required is to attach it to the current conducting terminal in an electrical apparatus that has been made into a product, there is no need to change the design or the like; there is also no need to re-build the manufacturing line since all that is required in installation is to fit the adapter into the current conducting terminal 30.

What is claimed is:

1. An electrical apparatus, comprising:
   a battery box;
   a seat which is provided on the battery box to support a current conducting terminal, said current conducting terminal being in contact with either a positive or a negative electrode of one battery and in contact with an electrode of opposite polarity of another battery for conducting current between the two batteries and comprising
      one electrode which is in contact with the either positive or negative electrode of the one battery by means of a contact on the one electrode;
      another electrode which is in contact with the electrode of opposite polarity of the another battery by means of another contact on the another electrode; and
      a conductive polymer which is placed between the one electrode and the another electrode; and
   a holding means which (a) is provided on the seat of the current conducting terminal, and (b) secures the current conducting terminal.

2. A current conducting terminal adapter which is attached to a current conducting terminal which is in contact with either a positive or a negative electrode of a battery for conducting current to a circuit, comprising:
   a relay current conduction piece which comprises
      one electrode which is in contact with the current conducting terminal;
      another electrode which is in contact with the electrode of opposite polarity of the battery; and
      a conductive polymer which is placed between the one electrode and the another electrode; and
   a resin body which holds the relay current conduction piece, and is attachable to or detachable from the current conducting terminal.

3. The electrical apparatus of claim 1 wherein the contact and the another contact are exposed while other parts of the current conducting terminal are encased in a resin body.

4. The electrical apparatus of claim 1 wherein the conductive polymer exhibits a PTC characteristic.

5. The current conductive terminal adapter of claim 2 wherein the conductive polymer exhibits a PTC characteristic.

* * * * *